United States Patent
Schilling et al.

(10) Patent No.: US 6,436,568 B1
(45) Date of Patent: Aug. 20, 2002

(54) METHOD AND TOOL FOR PRODUCING BIPOLAR PLATES

(75) Inventors: Hermann Schilling, Weinheim; Eberhard Bock, Mörlenbach; Günter Hofmann, Ladenburg, all of (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/520,059

(22) Filed: Mar. 7, 2000

(30) Foreign Application Priority Data

Mar. 10, 1999 (DE) .......................... 199 10 487

(51) Int. Cl.⁷ ................................ H01M 2/08
(52) U.S. Cl. .................. 429/35; 429/34; 429/38; 29/623.1; 29/623.2
(58) Field of Search ............. 429/34, 35, 38; 29/623.1, 623.2

(56) References Cited

U.S. PATENT DOCUMENTS

| 4,731,013 A | * | 3/1988 | Schrammel | 425/542 |
| 5,527,363 A | * | 6/1996 | Wilkinson et al. | 29/623.1 |
| 5,928,807 A | * | 7/1999 | Elias | 429/35 |

FOREIGN PATENT DOCUMENTS

| EP | 0 604 683 | 7/1994 |
| EP | 0 774 794 | 5/1997 |
| WO | 93/06627 | 4/1993 |

* cited by examiner

Primary Examiner—Carol Chaney
Assistant Examiner—Dah-Wei D. Yuan
(74) Attorney, Agent, or Firm—Kenyon & Kenyon

(57) ABSTRACT

A method and tool for producing bipolar plates having liquid channels and gas channels, and having sealing elements made of polymer material for fuel cells. The bipolar plates are stamped, i.e., liquid and gas channels are impressed into the bipolar plates, and sealing elements are applied to the bipolar plates in one tool in two steps directly following each other.

14 Claims, 2 Drawing Sheets

METHOD AND TOOL FOR PRODUCING BIPOLAR PLATES

BACKGROUND OF THE INVENTION

Electrochemical fuels cells are gaining increasing importance. They are made essentially of two separating plates, so-called bipolar plates, between which an ion-exchange membrane is arranged. The plates are provided with channels for gases and liquids, and are produced predominantly of graphite or metal. The manufacturing methods for their production are relatively costly, since a high degree of imperviousness is required when assembling the plates, so that the reaction and cooling media remain separated from each other during the operation of the fuel cell.

The PCT Application WO 93/06627 deals with the assembly of a fuel cell in detail. The separating plates are made of graphite. However, the publication gives no more precise information as to how these separating plates were manufactured. There is also no detailed information with respect to the seals between the individual gas-containing and liquid-containing channels; the publication merely mentions that the periphery of the individual plates is provided with a seal.

In the European Patent Application EP 0 604 683, reference is made to a method, customary until now, for producing a fuel cell, in which separating plates made of graphite are employed and a sealing material made of silicon, rubber or extrudable, elastomeric material is suggested. The sealing material is injected into the mechanically introduced grooves of the separating plate before the plates are assembled. However, this publication provides little further information concerning the injection process.

It is generally known to produce the separating plates and the seals separately, and in a subsequent step, to cement the seals individually into place in the preselected grooves of the separating plates. This process is time-consuming, difficult to control, and involves the danger of production errors. To avoid this, it has already been suggested (see European Patent Application EP 0 774 794) to produce the separating plate from a flexible, plastically deformable material and to provide it with integrated elevations which, at the same time, can be used as seals. Such plates can be produced in an embossing process, it being necessary that the embossing die utilized have suitable elevations for forming the gas and liquid channels and suitable depressions for forming the sealing arrangement. It may be that, in this case, the separating plate and the seal are produced in one work operation, however, with the disadvantage that both are made of the same material and thus are restricted in their sealing function.

SUMMARY OF THE INVENTION

The object of the present invention is to develop a method and a tool for creating bipolar plates, the method being simple to implement and allowing quick and reliable bonding of the seal to the bipolar plate. Consequently, simple and rapid assembly of the fuel cell should also be possible. The method is intended to be usable both for bipolar plates made of super-refined steel plate and those made of graphite.

The objective is achieved according to the invention in a method for producing bipolar plates having liquid channels and gas channels and having sealing elements of polymer material for fuels cells, in that the bipolar plates are stamped, i.e., the liquid and gas channels are impressed into the bipolar plates, and the sealing elements are applied to the bipolar plates in one tool with two steps immediately following each other. Therefore, a tool is employed which is used both for imprinting the channels and the grooves, as well as for applying the sealing elements.

According to this method, it is possible to injection-mold the sealing elements onto the bipolar plates. However, it is also possible to join the sealing elements to the bipolar plates in the pressing process. The attachment of the sealing elements to the locations on the bipolar plates provided for that purpose can be carried out directly on the even surfaces of the bipolar plates. However, it is beneficial to provide the bipolar plates with grooves for the sealing elements. If the bipolar plates are to be furnished with grooves for the sealing elements, it is advantageous if the mutually opposing grooves are applied in a manner that they are laterally offset relative to each other. In this manner, a counterpressure can very conveniently be built up when introducing or securing the sealing elements in the groove. However, this does not rule out that the mutually opposing grooves on both sides of a bipolar plate can be applied in alignment relative to each other.

Also provided is a tool for implementing the method. This tool is designed as a combined embossing die and injection-molding die or compression molding die. The tool is used first to carry out the stamping process, for which there are two possibilities. In the event that the bipolar plate is made of a super-refined steel plate, the appropriate channels and grooves are impressed into the flat sheet. In the case of bipolar plates made of graphite, the graphite material is subjected to a compression process and the appropriate channels and grooves are produced during this process. In the areas corresponding to the groove areas provided on the bipolar plates, the tool is furnished with separate dies stamps which, after the embossing process, clear the space for the seal to be introduced. If the injection-molding process is provided, the dies are only pulled back to the point that they clear the space needed for the seal. Thus, they represent the delimitation for the sealing surface of the sealing element. It is also possible to use dies, inserted into the tool, which are removed before the injection molding. After the injection-molding process is completed, the tool is opened and the plate, provided with the seals, is removed.

However, it is also possible to utilize the dies for the stamping process and for a pressing process. In this case, the tool is first used to produce the bipolar plate with the suitable channels and grooves. The dies are then completely drawn back out of the tool and a pre-fabricated seal blank is inserted in the resulting space into the grooves. The dies thereupon travel back again and press the seal against the bipolar plate. When working with seals made of elastomers or silicon, the process can be supported by supplying heat, making it possible to carry out a hot vulcanization process. In the case of seals made of thermoplastically workable materials, the hardening is effected by solidification after the withdrawal of heat. Another alternative is that the groove dies are separate dies which are removed after the stamping process. After that, the seal blank is inserted into the grooves and compression molding is carried out by closing the mold.

To avoid damaging the plates at the high pressures which occur particularly during the pressing process, it is beneficial if the mutually opposing dies of the tool are actuated in succession over time for the injection process. In this manner, the seal can first be applied on one side of the plate, while from the other side, the die remaining in its original position exerts a counterpressure on the bipolar plate. After the seals are applied on the one side of the plate, the dies of the opposite side are retracted and the sealing elements are introduced. During this process, the dies of the first side remain in normal position and are used as an abutment. This method can be used both for bipolar plates which have grooves lying opposite each other on both sides in alignment, as well as for plates in which the opposite grooves are applied in a manner that they are laterally offset relative to each other.

BRIEF DESCRIPTION OF THE DRAWING

The invention is described in more detail on the basis of two illustrative embodiments.

DETAILED DESCRIPTION OF THE INVENTION

Figure 1:
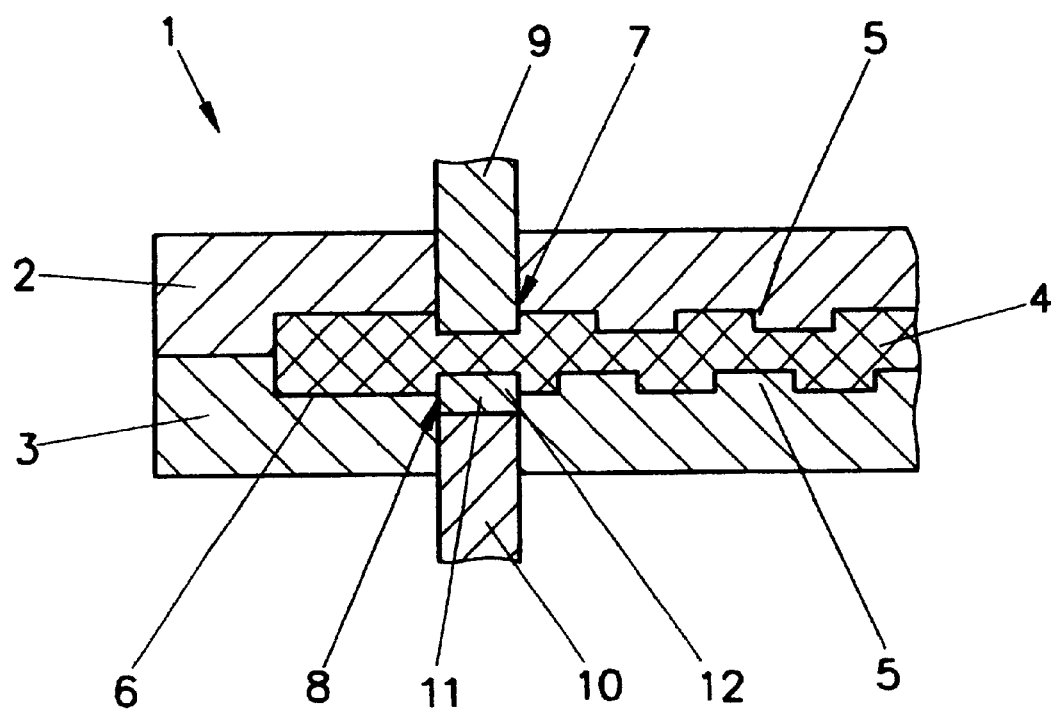
FIG. 1 is a cross-sectional view of a side portion of a tool constructed according to the principles of the invention.

FIG. 1 shows merely a side edge of a tool 1 in section, based upon which the method and the mode of operation of tool 1 shall be explained. Tool 1 is made of two embossing plates 2 and 3 which, during the closing operation of the molding press (not shown in greater detail), stamp bipolar plate 4 made of graphite. Bipolar plate 4 is provided with channels 5 representing the later liquid and gas channels. Grooves 7 and 8 for the sealing elements to be applied are impressed into lateral edge 6 of bipolar plate 4. Grooves 7 and 8 are imprinted with the aid of dies 9 and 10 which are fixedly joined to embossing plates 2 and 3 during the stamping process. In the upper part of FIG. 1, die 9 in embossing plate 2 is shown in its final position—in the embossing position. In lower embossing plate 3, die 10 has already been pulled back and clears space 11 for sealing material 12 to be injected or impressed. During the injection process, die 9 remains in the position indicated. After the injection process for sealing material 12, die 9 is pulled back into a similar position as is assumed by die 10, and a sealing material is thereupon introduced in the upper region of plate 4 as well. After both sealing elements 12 are applied in both grooves 7 and 8 on the two sides of plate 4, tool 1 is opened and finished plate 4, provided with seals 12, is removed.

Figure 2:
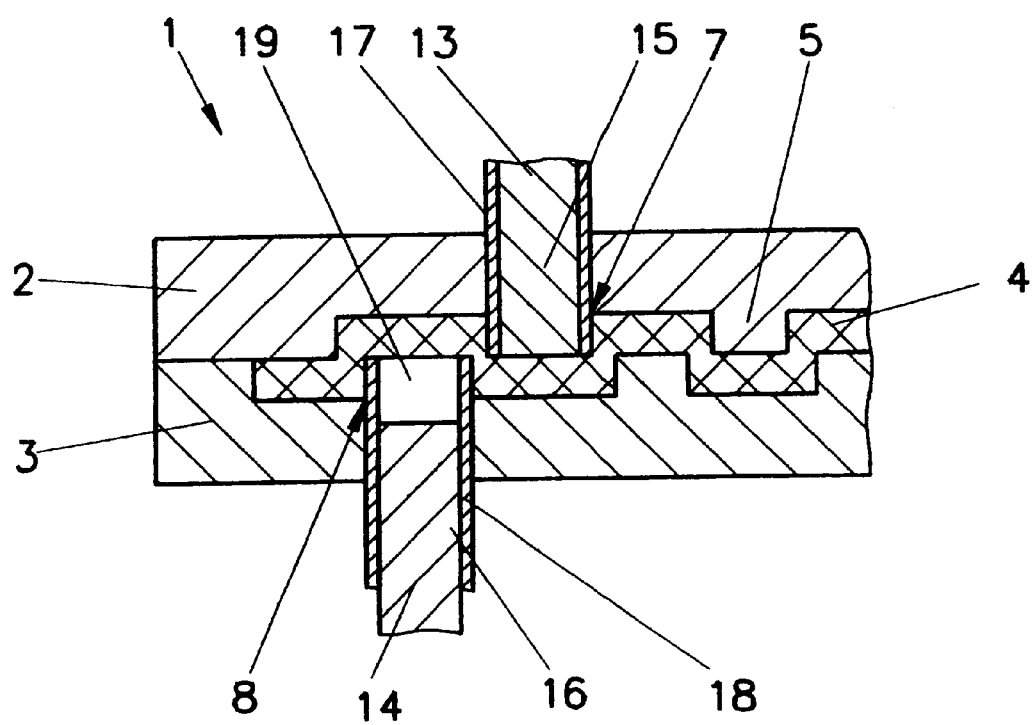
FIG. 2 is a cross-sectional view of a second embodiment having grooves that are laterally offset relative to each other.

FIG. 2 shows a second embodiment in which grooves 7 and 8 are applied in a manner that they are laterally offset relative to each other. Embossing plates 2 and 3 have approximately the same design as in FIG. 1 and are provided with channels 5. In the upper part of the Figure, as already described in FIG. 1, stamping die 13 is shown in its final position provided for the stamping process. It abuts with its end face against the bottom of the groove. However, in this case, stamping dies 13 and 14 are composed of two parts, namely, core parts 15 and 16 and jacket parts 17 and 18. For introducing the sealing elements, in this specific embodiment, only core part 15 or 16 in question is pulled out to clear space 19 for a sealing element 12. This sealing element 12 is not shown in the Figure. However, jacket 18 remains standing on the groove bottom, so that the introduced sealing element does not take up the entire space of groove 8, and after jacket 18 is removed, a clearance results between the sealing element and the lateral groove walls. The latter has a particularly beneficial effect on the elasticity of the sealing element, since the sealing element then has the possibility of spreading laterally during the assembly of the individual bipolar plates. After the sealing elements are introduced on the bottom side of plate 4, an identical procedure is carried out on the top side of plate 4, namely, first of all core 15 of stamping die 13 is drawn out and a free space is cleared for the sealing element, the sealing element is introduced, and the entire tool 1 is thereupon opened to remove plate 4. The specific embodiment according to FIG. 2 is particularly well-suited for bipolar plates made of sheet metal.

In the examples indicated, the injection-molding process was selected for introducing sealing elements 12. Tool 1 is equipped with suitable pass-through openings for the sealing material. However, it is also easily possible to draw dies 9, 10, 13 and 14 completely out of embossing plates 2 and 3, or to remove inserted dies and to insert a pre-fabricated seal into grooves 7 and 8, and after that to pull the dies in again and to mold the seal on plates 4 in the pressing process.

What is claimed is:

1. A method for producing bipolar plates having liquid channels and gas channels, and having sealing elements made of polymer material for fuel cells, comprising the steps of:

stamping the bipolar plates to form channels for fluid; and forming sealing elements for the bipolar plates;

wherein these steps are accomplished in one tool in two successive steps.

2. The method as recited in claim 1, wherein the sealing elements are injection-molded onto the bipolar plates.

3. The method as recited in claim 1, wherein the sealing elements are joined to the bipolar plates in a pressing process.

4. The method as recited in claim 1, wherein the bipolar plates are provided with grooves for accommodating sealing elements.

5. The method as recited in claim 3, wherein the bipolar plates are provided with grooves for accommodating sealing elements.

6. The method as recited in claim 1, wherein the grooves are provided on both sides of a bipolar plate and are applied in a manner that they are laterally offset relative to each other.

7. The method as recited in claim 4, wherein the grooves are provided on both sides of a bipolar plate and are applied in a manner that they are laterally offset relative to each other.

8. The method as recited in claim 1, wherein opposing grooves on both sides of a bipolar plate are disposed in a manner that they are in alignment relative to each other.

9. The method as recited in claim 4, wherein opposing grooves on both sides of a bipolar plate are disposed in a manner that they are in alignment relative to each other.

10. A tool for producing a bipolar plate, comprising a combined embossing die and injection-molding die or compression molding die, wherein the embossing and the injection-molding or compression molding are performed in two successive steps.

11. The tool as recited in claim 10, further comprising one or more separate dies for defining a space for one or more seals to be introduced.

12. A tool for producing a bipolar plate, comprising
   a combined embossing die and injection-molding die or compression molding die; and
   one or more separate dies for defining a space for one or more seals to be introduced, wherein the one or more separate dies are also used for pressing one or more seals against the bipolar plate.

13. The tool as recited in claim 12, wherein a first separate die laterally opposes a second separate die, and wherein the first and second separate dies are actuated in succession over time for pressing one or more seals against a bipolar plate.

14. The tool as recited in claim 10, further comprising a first separate die laterally opposing a second separate die, wherein the first and second separate dies are actuated in succession over time for injection-molding or compression molding.

* * * * *